United States Patent
Riehmann et al.

(10) Patent No.: US 10,233,880 B2
(45) Date of Patent: Mar. 19, 2019

(54) SUCTION HEAD FOR CONNECTION TO A FUEL HOSE

(71) Applicant: Andreas Stihl AG & Co. KG, Waiblingen (DE)

(72) Inventors: Jens Riehmann, Stuttgart (DE); Harald Schliemann, Waiblingen (DE); Manuel Dangelmaier, Plochingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/729,015

(22) Filed: Oct. 10, 2017

(65) Prior Publication Data

US 2018/0128221 A1 May 10, 2018

(30) Foreign Application Priority Data

Nov. 10, 2016 (EP) .................................. 16400051

(51) Int. Cl.
*F02M 37/00* (2006.01)
*B01D 29/86* (2006.01)
(Continued)

(52) U.S. Cl.
CPC ............ *F02M 37/02* (2013.01); *B01D 29/00* (2013.01); *B01D 29/0029* (2013.01); *B01D 29/0059* (2013.01); *B01D 29/86* (2013.01); *B01D 35/005* (2013.01); *B01D 39/08* (2013.01); *F02B 75/02* (2013.01); *F02M 37/007* (2013.01); *F02M 37/22* (2013.01); *F02B 2075/027* (2013.01); *F02M 2037/228* (2013.01)

(58) Field of Classification Search
CPC ............ B01D 29/0029; B01D 29/0034; B01D 29/0036; B01D 29/0054; B01D 29/0056; B01D 29/11; B01D 29/86; B01D 39/08; B01D 39/083; B01D 39/086; B01D 39/10; F02M 37/00; F02M 37/007; F02M 37/22; F02M 2037/2028; F04B 53/005
See application file for complete search history.

(56) References Cited

U.S. PATENT DOCUMENTS 1,304,918 A * 5/1919 Sweetland ............ D03D 25/00
139/425 R
2,788,125 A * 4/1957 Webb .................. B01D 35/0273
210/172.4

(Continued)

FOREIGN PATENT DOCUMENTS

DE  10 2011 003 645   8/2012

*Primary Examiner* — Erick R Solis
(74) *Attorney, Agent, or Firm* — Gudrun E. Huckett

(57) ABSTRACT

A suction head for connection to a fuel hose in a fuel tank has a base member made of an injection molding material. The base member has a peripheral wall surface provided with cutouts and also has an end face opening. A cap closes off the end face opening. A connecting socket for the fuel hose is provided on the suction head. A first filter element is received inside the base member. A second filter element covering the cutouts is provided and is made of a filter fabric, wherein the filter fabric is a twill weave fabric or a satin weave fabric. The filter fabric has a mesh size that is greater than 10 μm and smaller than 25 μm. A power tool with a four-stroke engine is provided with such a suction head in the fuel tank.

13 Claims, 5 Drawing Sheets

(51) Int. Cl.
    *F02M 37/02*     (2006.01)
    *B01D 29/00*     (2006.01)
    *F02B 75/02*     (2006.01)
    *F02M 37/22*     (2019.01)
    *B01D 35/00*     (2006.01)
    *B01D 39/08*     (2006.01)

(56) References Cited

U.S. PATENT DOCUMENTS

| | | | |
|---|---|---|---|
| 3,132,099 A * | 5/1964 | Eilhauer | B01D 39/083 |
| | | | 156/155 |
| 3,502,116 A * | 3/1970 | Crawford | B01D 39/086 |
| | | | 139/425 A |
| 3,826,372 A * | 7/1974 | Bell | B01D 35/0273 |
| | | | 210/172.4 |
| 3,841,489 A | 10/1974 | Combest et al. | |
| 4,691,744 A * | 9/1987 | Haver | D03D 15/02 |
| | | | 139/425 A |
| 4,874,510 A * | 10/1989 | Akira | B01D 29/15 |
| | | | 210/172.4 |
| 5,395,520 A * | 3/1995 | Ito | B01D 29/15 |
| | | | 210/172.4 |
| 5,702,237 A * | 12/1997 | Hill | B01D 29/114 |
| | | | 210/167.02 |
| 6,167,874 B1 | 1/2001 | Becker et al. | |
| 6,482,321 B1 | 11/2002 | Bossler et al. | |
| 2005/0150826 A1 | 7/2005 | Sato et al. | |
| 2009/0321347 A1* | 12/2009 | Ogose | B01D 35/0273 |
| | | | 210/452 |
| 2013/0133620 A1 | 5/2013 | Kinnen et al. | |
| 2016/0074788 A1 | 3/2016 | Erlenmaier et al. | |

\* cited by examiner

SUCTION HEAD FOR CONNECTION TO A FUEL HOSE

BACKGROUND OF THE INVENTION

The invention relates to a suction head for connection to a fuel hose in a fuel tank. The suction head is comprised of a housing-shaped base member made of an injection molding material, wherein the base member has an end face opening that is closed off by means of an attached cap. The suction head comprises a connecting socket for the fuel hose wherein the connecting socket can be integrally formed on the base member or on the cap. In the base member of the suction head, a first filter element is received. The base member has cutouts in its outer wall that are covered by a second filter element.

Such suction heads with filter properties are preferably used in power tools that are carried by an operator and provided with a two-stroke engine, a four-stroke engine or a mixture-lubricated four-stroke engine as a drive motor. Due to the connection to a flexible fuel hose, the suction head is located at the lowermost part of the fuel tank and ensures in this way a position-independent fuel supply to the internal combustion engine.

In operation of the internal combustion engine, a liquid fuel/oil mixture flows through the suction head to the mixture forming device. The fuel/oil mixture first flows through the outer filter element and then through the inner filter element and the fuel hose to the mixture forming device. Dirt particles are primarily retained at the outer filter element wherein the smooth side of the outer filter element which is comprised of filter fabric favors the formation of a filter cake. When deposited dirt particles have combined to a filter cake, removal from the filter fabric by movement and vibration of the suction head is hardly possible anymore. The flow resistance of the suction head rises and the fuel conveyance rate drops so that disturbances in regard to operation of the internal combustion engine may occur. For example, in case of hand-carried power tools that have a carburetor with a solenoid valve, dirt particles may impair the function of the solenoid valve.

The invention has the object to further develop a suction head of the aforementioned kind in such a way that, while providing a high filtering action over an extended operating period, the flow resistance of the suction head does not rise undesirably.

SUMMARY OF THE INVENTION

In accordance with the invention, this object is solved in that the second filter element is comprised of a filter fabric produced as a twill weave or a satin weave and in that the filter fabric is embodied to have a mesh size that is greater than 10 µm and smaller than 25 µm.

The second outer filter element is comprised of a filter fabric that is a twill weave fabric or a satin weave fabric, wherein the filter fabric is embodied with a mesh size that is greater than 10 µm and smaller than 25 µm. The very small mesh size ensures a high filtering action and prevents penetration of dirt into the fuel system of the mixture forming device. The twill weave fabric or satin weave fabric has a three-dimensional structure so that the fabric face which is facing the incoming fuel is rough and structured multi-dimensionally. The three-dimensional fabric surface prevents that the retained dirt particles combine to a filter cake. Despite of this, a high filtering action is provided without the flow resistance of the suction head rising disadvantageously even after a long operating period.

Since the three-dimensional fabric structure counteracts the formation of a filter cake, movements and vibrations that are transmitted from the internal combustion engine to the suction head cause the dirt particles adhering to the filter element to be thrown off so that, despite a minimal mesh size in the range of 10 µm to 25 µm, a significant clogging of the filter fabric does not occur or occurs only at a reduced level.

For a further reduction of the mesh size to a range of 12 µm to 20 µm, a high service life of the suction head without impairment of the flow resistance has been observed also. Advantageously, a mesh size of 15 µm is employed. Over a long operating duration, the flow resistance of the suction head can be maintained at the same level.

In a particular embodiment of the invention, the mesh size of the filter fabric is smaller than the pore size of the first filter element in the housing. The suction head thus has a pore size/mesh size of the filter elements that is increasing from the exterior to the interior.

The cutouts in the peripheral wall surface of the base member of the suction head housing are separated from each other by stays. The cutouts can be designed, for example, as fenestrations. The base member is produced by injection molding wherein first the filter fabric is positioned in the injection mold and then the injection molding material is introduced. The filter fabric is secured by the stays in the region of the stays. Advantageously, the filter fabric is joined with the material of the stays in the area of the stays. In particular, the injection molding material engages or penetrates with form fit in the region of the stays into the fabric structure of the filter fabric. The filter fabric is advantageously secured by form fit at the stays. The filter fabric is in particular fixed in the region of the stays by the injection molding material that has been injected into the mold.

In a particular embodiment of the invention, the filter fabric is formed as a filter hose with a first open end and a second open end. The filter hose can be introduced easily into an injection mold. One end of the filter hose is seal-tightly embedded in the injection molding material of the base member. Preferably, the end of the filter hose is seal-tightly embedded in the injection molding material of the bottom of the base member. Advantageously, the filter hose is arranged such that a seam of the filter hose is positioned in the region of a stay. The seam of the filter hose is advantageously secured by form fit in the region of the stay. Due to this preferred arrangement, the seam of the filter hose is protected from wear.

A filtration-tight connection is achieved when the filter fabric at the end of the filter hose is penetrated with form fit by the injection molding material of the base member.

Expediently, the pore size of the first filter element is within a size range of 30 µm to 70 µm.

The injection molding material from which the base member and the cap of the assembled suction head are formed is comprised preferably of plastic material. The filter fabric in a further embodiment of the invention is manufactured as a screen fabric of monofil threads. The monofil threads can be comprised of polyamide. The thread size of the individual threads is preferably greater than the mesh size of the filter fabric, in particular, the individual threads have a thread size of 35 µm.

Advantageously, the suction head according to the invention is employed in a power tool with a four-stroke engine which comprises a valve train for inlet and/or outlet valves arranged in the combustion chamber of the four-stroke engine. The valve train is lubricated by a fuel/oil mixture that is processed with combustion air, wherein the fuel/oil mixture is supplied by a fuel line from a fuel tank of the power tool to a mixture forming device. The fuel line projects with a flexible fuel hose into the fuel tank wherein the projecting free end of the flexible fuel hose is connected to the connecting socket of the suction head of the invention that comprises a housing-shaped base member of injection molding material, wherein the base member has an end face opening closed off by a cap, wherein a connecting socket for the fuel hose is provided on the suction head and a first filter element is received in the base member, wherein cutouts are provided in a peripheral wall surface of the base member, and a second filter element covers the cutouts, wherein the second filter element is comprised of a filter fabric manufactured as a twill weave or a satin weave and the filter fabric has a mesh size that is greater than 10 μm and smaller than 25 μm.

In particular in an embodiment of the suction head with an outer filter fabric having a mesh size of 15 μm, penetration of dirt into the valve train lubricated by the fuel/oil/air mixture has been reliably prevented. In this way, wear of the valve train by dirt that may be introduced via the fuel/oil mixture can be counteracted.

Further features of the invention result from the additional claims, the description, and the drawings in which an embodiment of the invention to be explained in detail in the following is illustrated.

DESCRIPTION OF THE PREFERRED EMBODIMENTS

Figure 1:
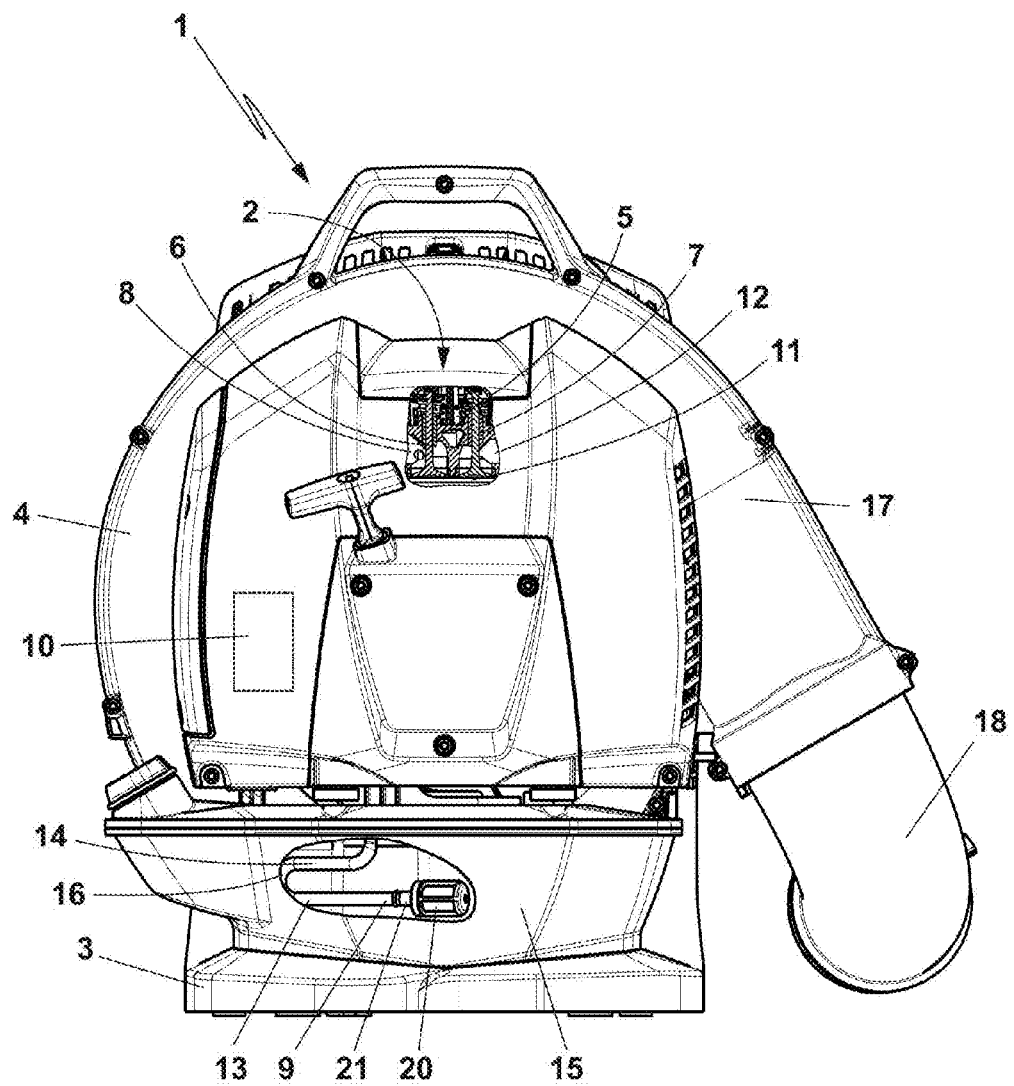
FIG. 1 is a view of the back of a blower device as an example of a power tool with a four-stroke engine.

FIG. 1 shows as an example of a power tool 1 a blower device in a view of the back of the blower. The term power tool refers to portable hand-guided power tools with an internal combustion engine, for example, a motor chainsaw, a hedge trimmer, a cut-off machine or similar devices.

As a drive motor of the power tool 1 according to an embodiment, an internal combustion engine, in particular a four-stroke engine 2 is provided. The blower device which is illustrated as an example is comprised substantially of a preferably L-shaped carrier 3 on which the blower is secured in a vibration-damping manner. The blower wheel which is arranged in the blower housing 4 is driven by the four-stroke engine 2; alternatively, the drive motor can be embodied also as a two-stroke engine or a similar drive motor.

The blower housing 4 comprises a blower outlet 17 which is provided with a connecting socket 18 for a blower tube.

The four-stroke engine 2 which is illustrated schematically in the embodiment comprises a valve train 5 which controls an inlet valve 6 and an outlet valve 7. The inlet valve 6 controls the inlet of fresh fuel/oil/air mixture which is supplied via an inlet passage 8. The inlet passage 8 is connected to a mixture forming device 10 which is embodied advantageously as a diaphragm carburetor and provides the fuel/oil/air mixture to be supplied to the combustion chamber 11. By means of an outlet valve 7, exhaust gas is discharged through the outlet passage 12.

The mixture forming device 10 is supplied from a fuel tank 15 with a fuel/oil mixture wherein the fuel/oil mixture is sucked in by a fuel hose 14 and a suction head 20 from the fuel tank 15. Expediently, a fuel pump can be provided for conveying the fuel/oil mixture. Advantageously, the fuel pump is driven by the pressure fluctuations of the crankcase.

The fuel hose 14 comprises at least one flexible hose section 13 whose free end 9 is secured to a connecting socket 21 of the suction head 20. For obtaining a high movability of the suction head 20 in the fuel tank 15, it can be expedient to guide the movable fuel hose 14 in loops 16, in particular flexible loops.

The suction head 20 is comprised substantially of a housing with a base member 22. The base member 22 comprises advantageously a cup-shaped configuration. An end face opening 24 is formed at the open end 23 of the base member 22. Between the bottom 25 of the base member 22 and the open end 23, cutouts 30, 31, 32, and 33 are formed in the peripheral wall surface 26 of the base member 22. The cutouts 30, 31, 32, and 33 form fenestrations surrounded by a closed frame within the peripheral wall surface 26 of the base member 22. The recesses 30, 31, 32, and 33 extend about a circumferential angle 34 of in particular 70°. The cutouts 30, 31, 32, 33 in circumferential direction of the cup-shaped base member 22 are separated from each other by stays 40, 41, 42, 43. The stays 40, 41, 42, 43 each extend about a circumferential angle of in particular 20°.

Figure 2:
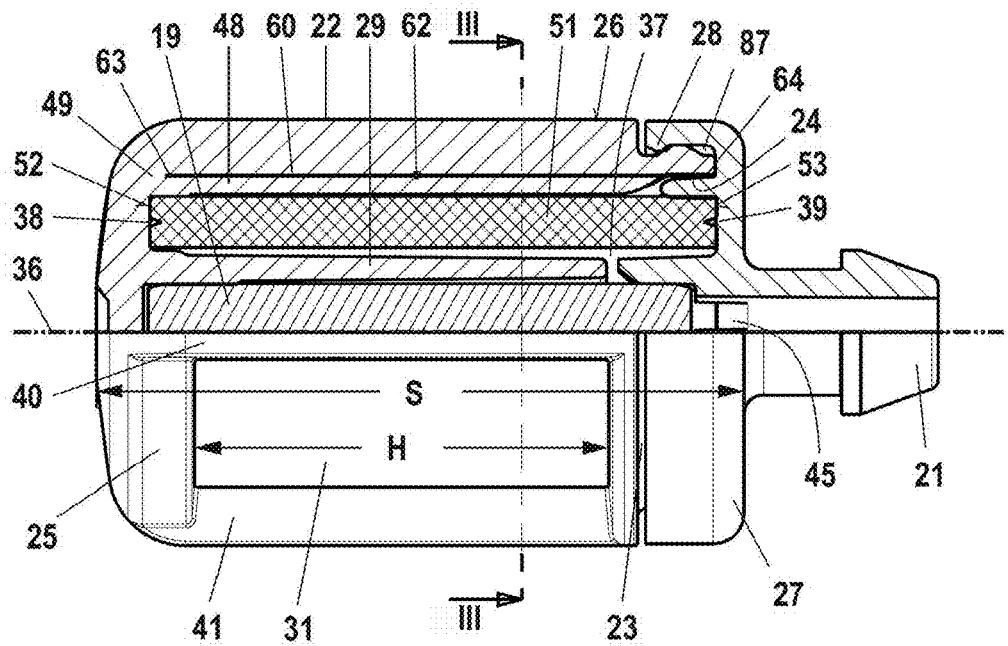
FIG. 2 is a side view, partially in section, of a suction head for connection to a fuel hose.
Figure 4:
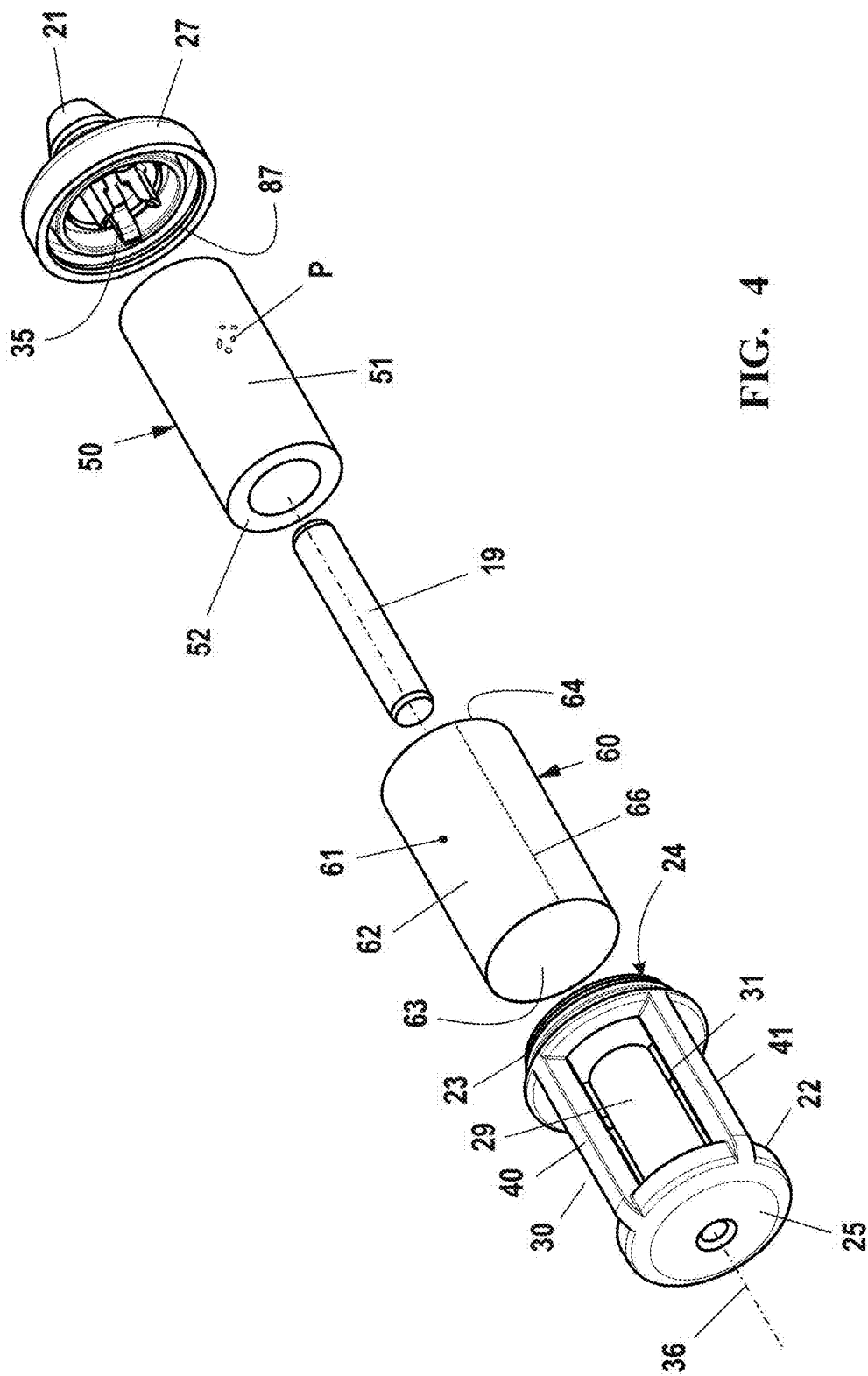
FIG. 4 is an exploded view of the basic components of a suction head according to FIG. 2.

As shown in FIGS. 2 and 4, in the embodiment each cutout 30, 31, 32, 33 has the same height H measured in the direction of the longitudinal center axis 36 of the suction head 20; this height H amounts to approximately 60% to 70% of the height S of the suction head 20 measured in the same direction.

The open end 23 of the base member 22 is engaged across by a cap 27 which locks in an undercut 28 at the open end 23 of the base member 22. The cap 27 supports preferably centrally the connecting socket 21 for the fuel hose 14. The rim of the open end 23 of the base member 22 is secured advantageously in a receiving groove 87 of the cap 27.

In the interior of the base member 22, a tubular receiving cylinder 29 is formed which is disposed centrally at the bottom 25 of the base member 22. The receiving cylinder 29 ends at a spacing in front of the open end 23 and serves for receiving a weight, in the embodiment advantageously in the form of a weight rod 19. The end of the weight rod 19 which is projecting out of the receiving cylinder 29 is secured in a claw-type receptacle 35 on the inner side of the attached cap 27. The center axis of the cylindrical weight rod 19 is positioned advantageously in alignment with the longitudinal axis 36 of the suction head 20.

In the interior 37 of the suction head 20 a first filter element 50 is arranged which is formed of a tubular sintered body 51. The sintered body 51 (FIG. 4) has a pore size P of approximately 30 μm to 80 μm, preferably to 70 μm, in particular a size of 60 μm. The sintered body 51 prevents penetration of air bubbles into the fuel hose 14 and in particular into the mixture forming device 10.

At its annular end faces 52 and 53, the sintered body 51 is advantageously secured by holding pins 38 of the bottom 25 and holding pins 39 of the cap 27 (FIG. 2). The first inner filter element 50 which is embodied as a sintered body 51 is secured without clearance within the base member 22. Between the receiving cylinder 29 and the sintered body 51 an annular gap 44 remains which is in flow communication by a flow opening 45 in the cap 27 with the connecting socket 21.

Figure 5:
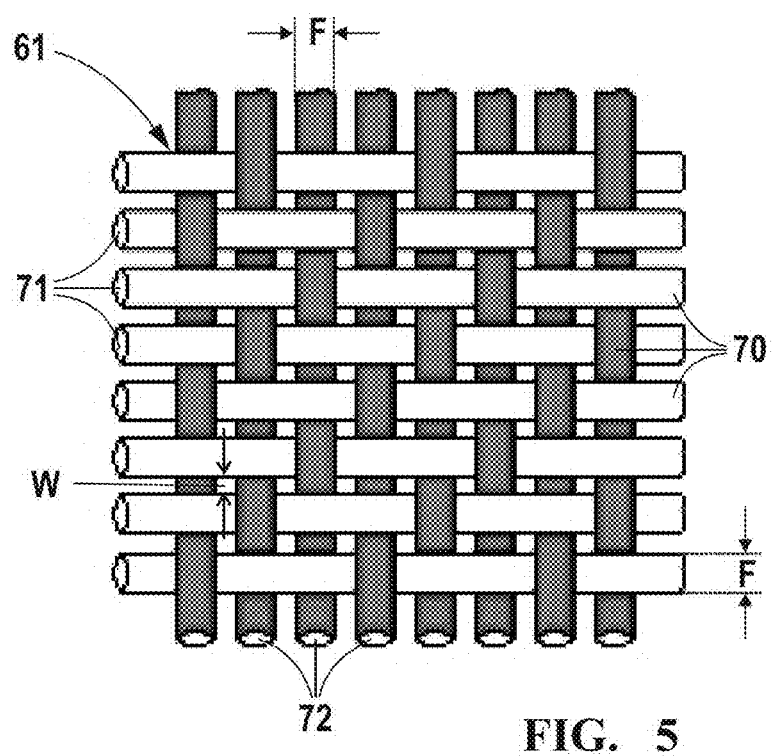
FIG. 5 is a schematic view of a detail of a filter fabric embodied as twill weave.
Figure 6:
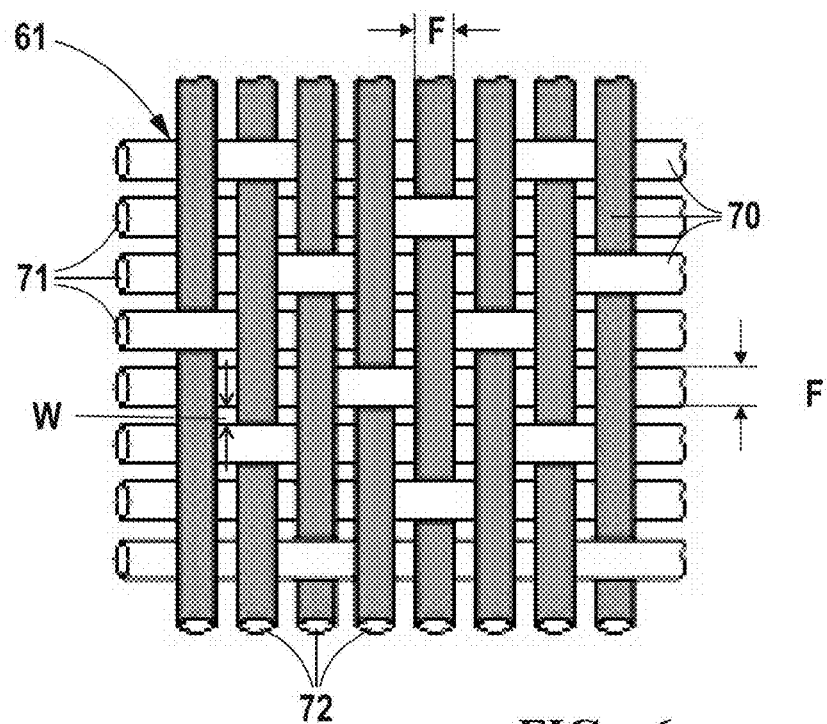
FIG. 6 is a schematic view of a detail of the filter fabric embodied as satin weave.
Figure 7:
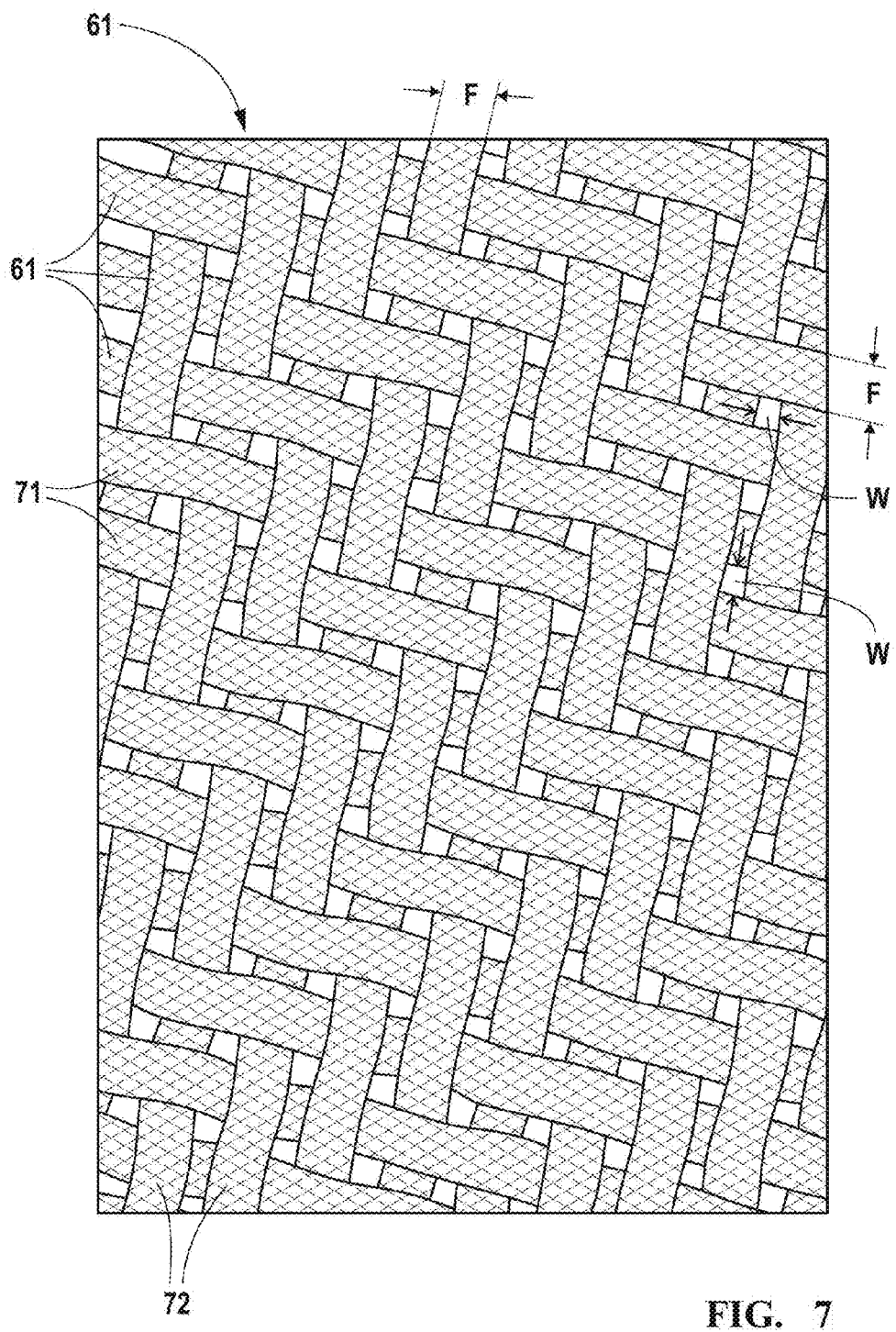
FIG. 7 is a schematic illustration of a detail of a filter fabric of a twill weave in a preferred embodiment.

The cutouts 30, 31, 32, 33 are covered on the inner circumference of the stays 40, 41, 42, 43 by a second outer filter element 60. The second filter element 60 is comprised of a filter fabric 61 whose fabric structure is schematically illustrated in FIGS. 5 to 7. The filter fabric 61 has a three-dimensional structure due to its fabric construction. The filter fabric 61 is secured on the inner circumference 46 of the stays 40, 41, 42, 43. Preferably, the filter fabric adheres to the stays 40, 41, 42, and 43. In particular, the filter fabric 61 is secured by the injection molding material of the base member 22 on the stays 40, 41, 42, 43. In a preferred embodiment, the injection molding material of the stays 40, 41, 42, 43 engages with form fit the three-dimensional structure of the filter fabric 61. This is indicated in FIG. 3 by the indicated radial noses 47 at the inner circumference 46 of the stays 40, 41, 42, and 43.

Figure 3:
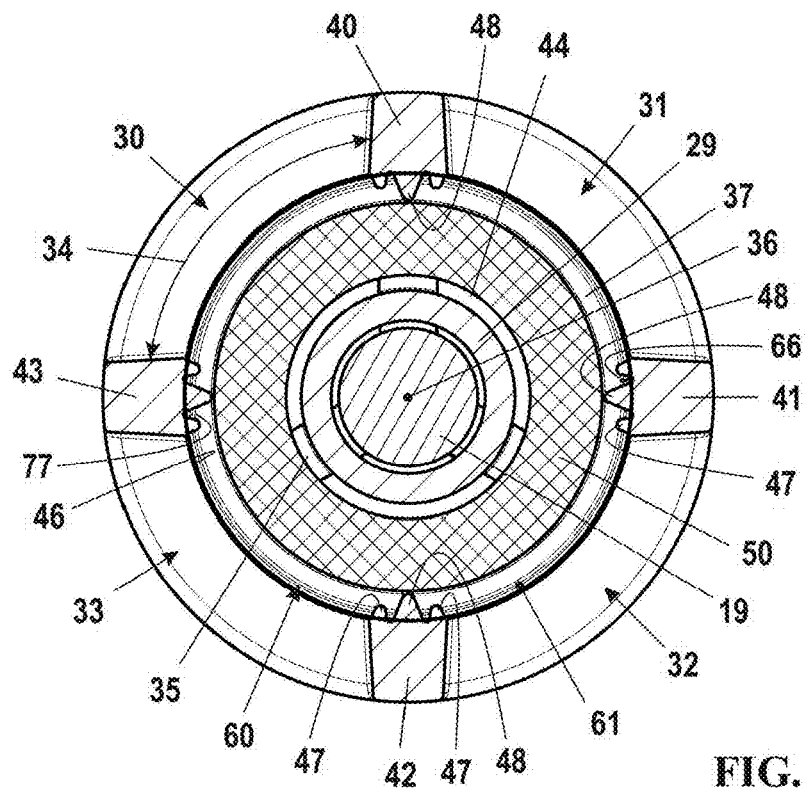
FIG. 3 is a section of the suction head along the section line III-Ill of FIG. 2.

For positional fixation of the sintered body 51 of the first filter element 50, advantageously holding ribs 48 are formed on the inner circumference 46 of the stays 40 to 43, as shown also in FIGS. 2 and 3. The holding ribs 48 are positioned diametrically opposite each other, respectively, so that the filter element 50 or its sintered body 51 is centrally fixed about its circumference by four holding ribs 48, in particular centrally relative to the longitudinal axis 36. The holding ribs 48 have in circumferential direction a circumferential spacing of preferably 90° relative to each other.

About the circumference of the base member 22, four stays 40, 41, 42, 43, in particular with identical circumferential spacing relative to each other, are provided. Accordingly, about the inner circumference 46 of the stays 40, 41, 42, 43 four holding ribs 48 are formed. The holding ribs 48 are positioned at the same circumferential spacing relative to each other.

The filter fabric 61 of the second outer filter element 60 is preferably configured as a filter hose 62, as shown in FIG. 4. The filter hose has a first open end 63 and a second open end 64. An open end 63, 64 of the filter hose 62 is preferably embedded seal-tightly during manufacture of the base member 22 in the injection molding material 49 of the base member 22.

As illustrated in FIG. 2, the first open end 63 of the filter hose 62 is embedded in the material of the bottom 25 of the base member 22. The injection molding material 49, which is in particular a plastic material, engages about the first open end 63 of the filter hose 62 so that during manufacture of the base member 22 the injection molding material 49 flows about the first open end 63 of the filter hose 62 and, after curing of the injection molding material 49, the first open end 63 is seal-tightly secured in the bottom 25 of the base member 22. The injection molding material 49 not only engages about the first open end 63 of the filter hose 62 but also penetrates into the filter fabric 61 of the filter hose 62. In this way, in addition a form-fit securing action of the first open end 63 of the filter hose 62 is provided.

The second open end 64 of the filter hose 62 is positioned in the open end 23 of the base member 22. The rim of the second open end 23 of the base member 22 is secured in the receiving groove 87 of the cap 27 wherein the second open end 64 of the filter hose 62 is positioned within the receiving groove 87.

For manufacturing a filter hose 62, a fabric layer can be folded and fused so that a seam 66 (FIG. 4) is produced. For an inexpensive manufacture of a filter hose 62, it can also be provided to place two fabric layers on top of each other in order to form a filter hose 62 by two weld seams. These two weld seams are positioned, relative to a longitudinal center axis of the filter hose, preferably diametrically opposite each other and form each a seam 66.

The filter hose 62 is advantageously arranged during manufacture of the base member 22 in such a way that the seam 66 (FIG. 4) extending in longitudinal direction of the filter hose 62 from the first end 63 to the second end 64 is positioned in the area of a stay (e.g. stay 41). The seam 66 of the filter hose 62 is advantageously secured with form fit in the area of the stay 41 (FIG. 3). Due to this preferred arrangement, the shape stability of the filter hose 62 is ensured. The preferred arrangement also ensures seal-tightness of the filter hose 62 in the base member 22. Also, due to the preferred arrangement the seam 66 of the filter hose 62 is protected from wear.

The stays 40 and 42 as well as the stays 41 and 43 are positioned, relative to the longitudinal center axis 36 of the suction head 20, diametrically opposed to each other (FIG. 3). A filter hose 62 with two seams 66, 77 is positioned such in the base member 22 that both oppositely positioned seams 66, 77 each are positioned in the area of one stay (41 or 43). In this way, seams 66, 77 of the filter hose 62 can be protected from wear.

The filter fabric 61 of the second filter element 60 is preferably manufactured as a twill weave according to FIG. 5 or expediently as a satin weave according to FIG. 6. In this connection, the filter fabric 61 is manufactured with a mesh size W that is greater than 10 μm and smaller than 25 μm. Preferably, the filter fabric 61 has a mesh size W in the range of 12 μm to 20 μm. In a preferred embodiment, the filter fabric 61 has a mesh size W of 15 μm.

The mesh size W of the filter fabric 61 is smaller than the pore size P of the first, in particular inner, filter element 50 (FIG. 4). The thread size F of the filtered fabric 61 is in a range of approximately 35 μm.

The filter fabric 61 which is advantageously manufactured of monofil threads 70 has in particular a fabric structure of twill weave as shown in FIG. 7. The individual threads 70 are comprised advantageously of polyamide.

The twill weave illustrated in FIG. 7 has the weave formula K2/2. A weft thread 71 extends below or atop two warp threads 72, respectively, in alternating sequence. Correspondingly, the warp threads 72 alternatingly extend below or atop two weft threads 71, as illustrated in FIG. 7. The individual threads 70 have a thread size of 35 μm, and a mesh size W between 10 μm and 25 μm is formed. Expediently, a mesh size W of 15 μm is provided.

FIG. 7 also illustrates that the filter fabric 61 does not have a smooth surface but a three-dimensional structure. This is advantageous for maintaining the filtering action over a long operating period because the filtering action does not only take place in the filter fabric plane but also in a direction of depth of the filter fabric 61. Due to the three-dimensional structure of the filter fabric 61 according to the invention the formation of a filter cake is counteracted. Possible movements of the suction head 20, due to it being secured at the free end 9 of the flexible fuel hose 14 and in particular vibration excitations due to the vibrations of the internal combustion engine, counteract lodging of dirt particles. These movements and vibrations cause the dirt particles that have deposited on the filter fabric 61 to be thrown off. Since the dirt particles among each other are prevented from forming the filter cake due to the three-dimensional fabric structure of the filter fabric 61, the function of the suction head 20 can be ensured with minimal flow resistance for an extended operating period.

The specification incorporates by reference the entire disclosure of European priority document 16 400 051.5 having a filing date of Nov. 10, 2016.

While specific embodiments of the invention have been shown and described in detail to illustrate the inventive principles, it will be understood that the invention may be embodied otherwise without departing from such principles.

What is claimed is:

1. A suction head for connection to a fuel hose in a fuel tank, the suction head comprising:
    a base member comprised of an injection molding material, the base member comprising a peripheral wall surface provided with cutouts and further comprising an end face opening;
    a cap closing off the end face opening:
    a connecting socket for the fuel hose;
    a first filter element received inside the base member;
    a second filter element covering the cutouts and comprised of a filter fabric, wherein the filter fabric is a twill weave fabric or a satin weave fabric;
    the filter fabric having a mesh size that is greater than 10 μm and smaller than 25 μm.

2. The suction head according to claim 1, wherein the mesh size is in a range of 12 μm to 20 μm.

3. The suction head according to claim 2, wherein the mesh size is 15 μm.

4. The suction head according to claim 1, wherein the mesh size of the filter fabric is smaller than a pore size of the first filter element.

5. The suction head according to claim 1, wherein the peripheral wall surface of the base member comprises stays and the stays separate the cutouts from each other, wherein the filter fabric is secured on the stays.

6. The suction head according to claim 5, wherein in the region of the stays the injection molding material of the base member engages with form fit a fabric structure of the filter fabric.

7. The suction head according to claim 1, wherein the filter fabric is a filter hose comprising a first open end and a second open end opposite the first open end, wherein the first open end of the filter hose is embedded seal-tightly in the injection molding material of the base member.

8. The suction head according to claim 7, wherein the filter fabric at the first open end of the filter hose is penetrated with form fit by the injection molding material of the base member.

9. The suction head according to claim 1, wherein the first filter element has a pore size in a range of 30 μm to 70 μm.

10. The suction head according to claim 1, wherein the injection molding material is a plastic material.

11. The suction head according to claim 1, wherein the filter fabric is a screen fabric comprised of monofil threads.

12. The suction head according to claim 11, wherein a thread size of the monofil threads is greater than the mesh size of the filter fabric.

13. A power tool comprising:
    a four-stroke engine comprising a valve train for an inlet valve and/or an outlet valve arranged in the combustion chamber of the four-stroke engine, wherein the valve train is lubricated by a fuel/oil mixture processed with combustion air;
    a fuel tank and a fuel line connected to the fuel tank, wherein the fuel/oil mixture is supplied by the fuel line from the fuel tank to a mixture forming device of the four-stroke engine;
    wherein the fuel line comprises a flexible fuel hose that projects into the fuel tank and has a projecting free end;
    a suction head comprising:
        a base member comprised of an injection molding material, the base member comprising a peripheral wall surface provided with cutouts and further comprising an end face opening;
    a cap closing off the end face opening:
    a connecting socket for the fuel hose;
    a first filter element received inside the base member;
        a second filter element covering the cutouts and comprised of a filter fabric, wherein the filter fabric is a twill weave fabric or a satin weave fabric;
        the filter fabric having a mesh size that is greater than 10 μm and smaller than 25 μm;
    wherein the projecting free end is connected to the connecting socket of the suction head.

* * * * *